2 Sheets—Sheet 1.
W. WRIGHT.
CULTIVATOR.
No. 178,826. Patented June 13, 1876.
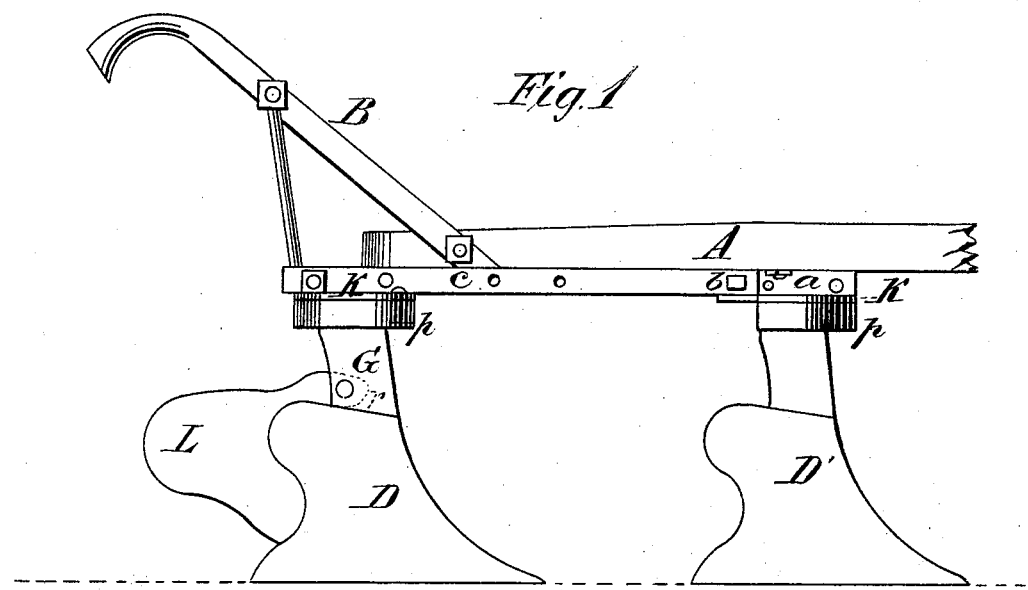
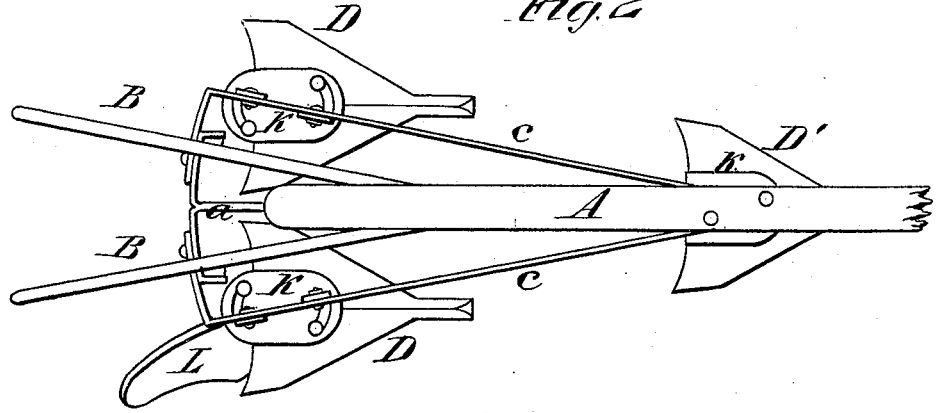
WITNESSES
C. H. Bates
George E. Upham.
INVENTOR
William Wright
Chipman Hosmer & Co
ATTORNEYS
N. PETERS, PHOTO-LITHOGRAPHER, WASHINGTON, D. C.

2 Sheets—Sheet 2.
W. WRIGHT.
CULTIVATOR.
No. 178,826. Patented June 13, 1876.
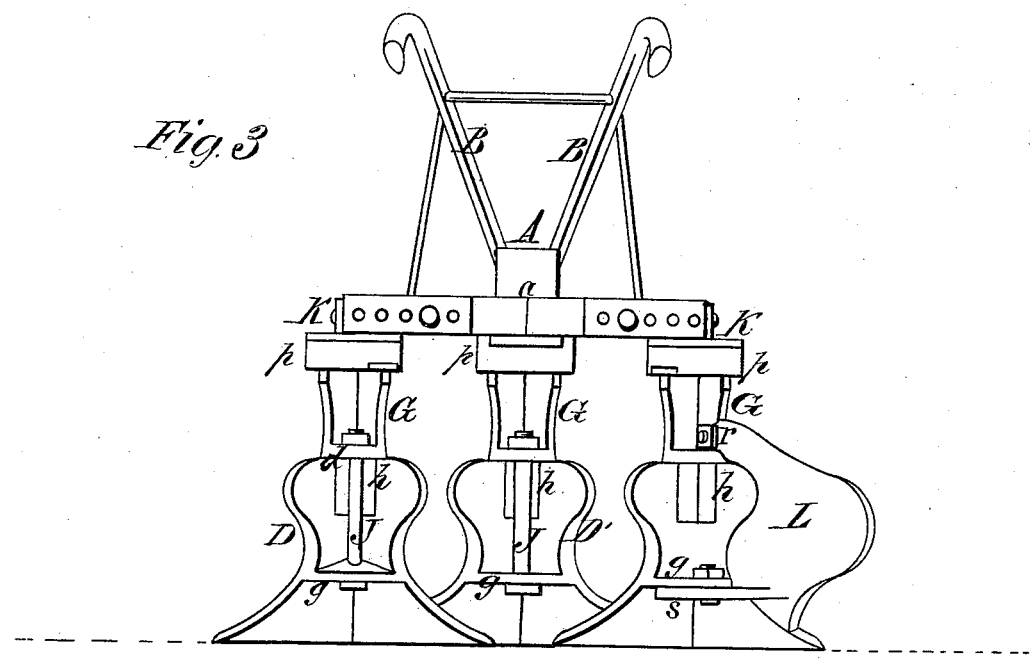
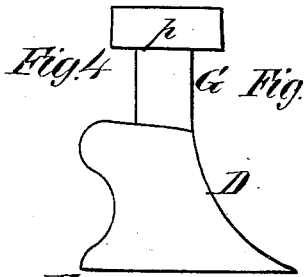
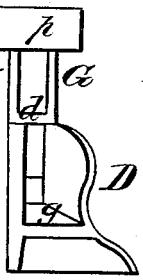
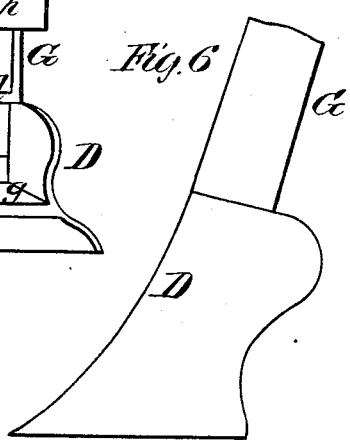
WITNESSES
E. H. Bates
George E. Upham.
INVENTOR
William Wright
Chipman Hosmer & Co
ATTORNEYS
N. PETERS, PHOTO-LITHOGRAPHER, WASHINGTON, D. C.

UNITED STATES PATENT OFFICE.

WILLIAM WRIGHT, OF LOCKPORT, NEW YORK.

IMPROVEMENT IN CULTIVATORS.

Specification forming part of Letters Patent No. 178,826, dated June 13, 1876; application filed November 20, 1875.

*To all whom it may concern:*

Be it known that I, WILLIAM WRIGHT, of Lockport, in the county of Niagara and State of New York, have invented a new and valuable Improvement in Cultivator-Teeth; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my cultivator, and Fig. 2 is a plan view of the same. Fig. 3 is a rear view thereof; and Figs. 4, 5, 6, and 7 are detail views, showing the teeth.

This invention has relation to the construction of teeth for cultivators; and the nature of my invention consists in a double or single turning-tooth, which is constructed to receive a tapered portion of a standard, in combination with webs and a bolt for securing the tooth and standard rigidly together, and admitting of the detachment of the tooth from the standard, as will be hereinafter explained.

In the annexed drawings, A designates a draft-beam, and B B are stilts or handles, which are secured rigidly thereto, and also to a flat longitudinal bar, a, beneath the beam A. Near the front end of the bar a two backwardly-diverging bars, c c, are rigidly secured to it by a transverse bolt, b, the rear curved ends of which bars are perforated at several points, and secured by bolts to the laterally-extended ends of the bar a. By removing said bolts the bars c c can be adjusted laterally, and the two rear teeth can be thus set at any desired distance apart. D D D' designate teeth, two of which are located near the rear end of the machine, and the other one is located at the front end of the bar a. The teeth shown in Figs. 1, 2, and 3 have concave double turning sides, so as to turn the soil laterally in two directions—*i. e.*, right and left. The teeth shown in Figs. 4, 5, 6, and 7 turn the soil in one direction only, but in all other respects they are constructed like the double mold-board teeth. Near the bottom of each tooth is a horizontal web, g, and above this web the back of the tooth is recessed, to receive a tapered tenon, h, which is formed on a standard, G. The upper edges of each tooth are beveled, and receive corresponding beveled edges formed on the standard G. This forms a close connection between the standard G and its shoe. The back of each standard G is open, and at d a diaphragm or web is formed, through which a bolt, J, passes, which bolt also passes through the web g, and receives a nut. By screwing up this nut the tooth is rigidly secured to its standard, and the wedging or tapered portion h of the standard is firmly drawn into its socket. Each standard G has an oblong head, p, formed on its upper end, which is secured to a plate, K, by means of screws or bolts that pass through curved slots, as shown in Fig. 2. By loosening said screws or bolts the teeth can be adjusted to run parallel to the line of draft, or for taking more or less land. The front tooth may remain fixed after once being set in the line of draft, but the two rear teeth will require adjustment whenever the bars to which they are secured are adjusted.

Figs. 1, 2, and 3 show a mode of extending the mold-board by the employment of a wing, L, having lugs r s formed on its front edge and inner side. The front edge of this wing L is curved, so as to correspond to the rear edge of the mold-board portion of a tooth, as shown in Fig. 1. The upper lug r is bolted to the standard, and the lower lug s to the web g, thus assisting in securing the tooth and its standard rigidly together.

What I claim as new, and desire to secure by Letters Patent, is—

The cultivator-tooth D, constructed as described, in combination with the tapered tenon h on the standard, the web d, and the bolt J, substantially as described.

In testimony that I claim the above I have hereunto subscribed my name in the presence of two witnesses.

WILLIAM WRIGHT.

Witnesses:
S. S. CROSS,
IRA E. BRIGGS.